Sept. 19, 1961   J. H. HAMMOND, JR., ET AL   3,001,187
MICROWAVE TELERECONNAISSANCE
Filed Oct. 21, 1955                         3 Sheets-Sheet 1
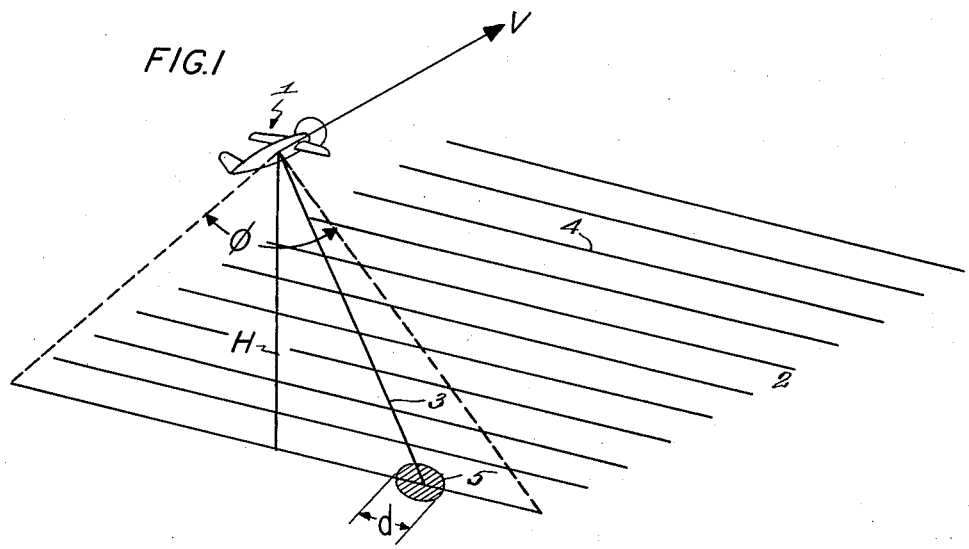
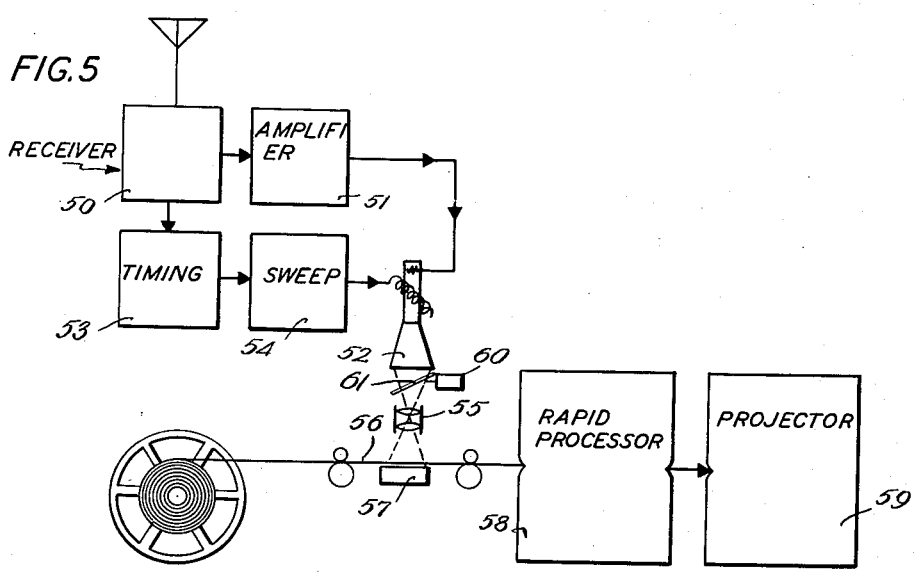
INVENTORS
JOHN HAYS HAMMOND, JR.
EMORY LEON CHAFFEE
BY
ATTORNEY

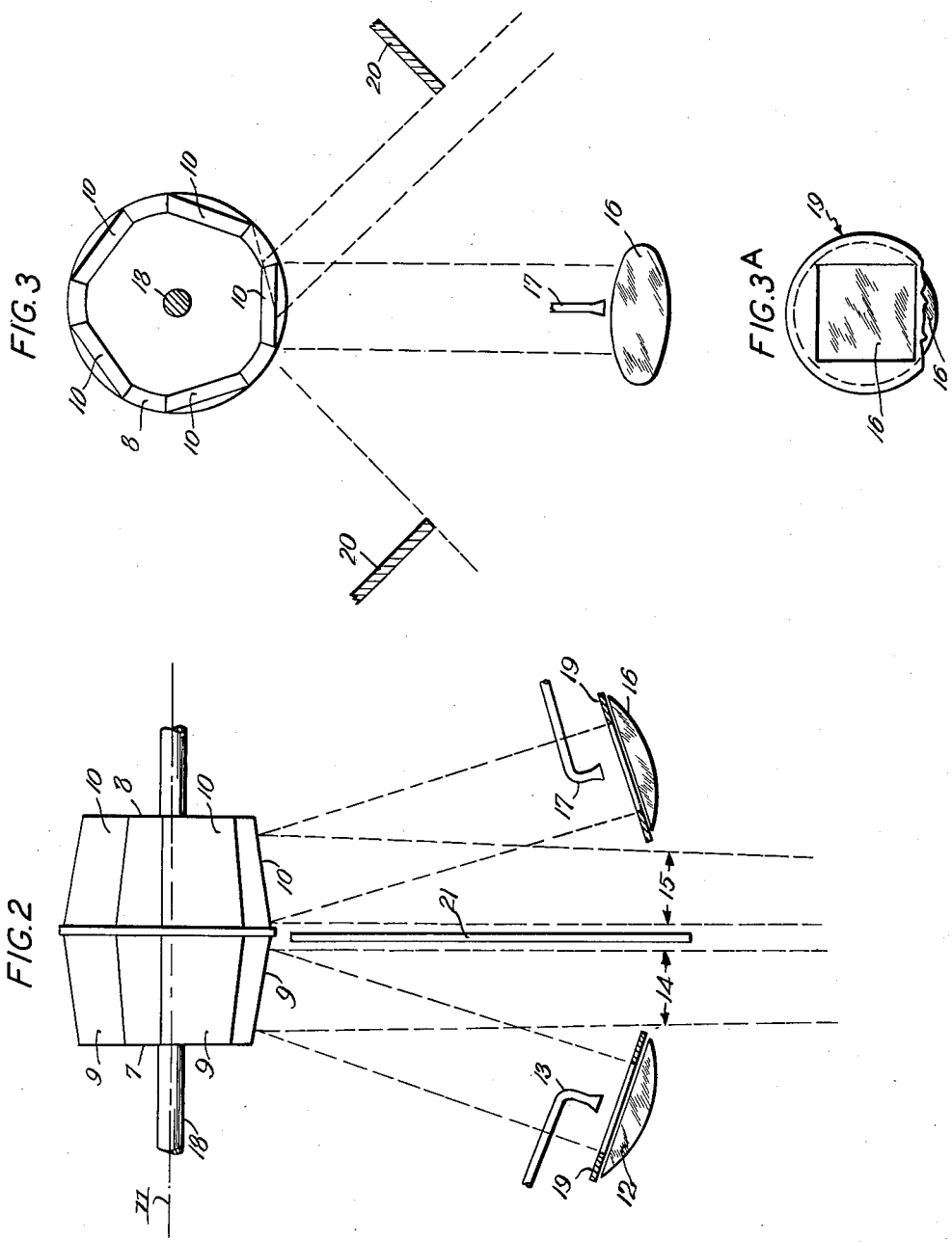

Sept. 19, 1961 J. H. HAMMOND, JR., ET AL 3,001,187
MICROWAVE TELERECONNAISSANCE
Filed Oct. 21, 1955 3 Sheets-Sheet 3
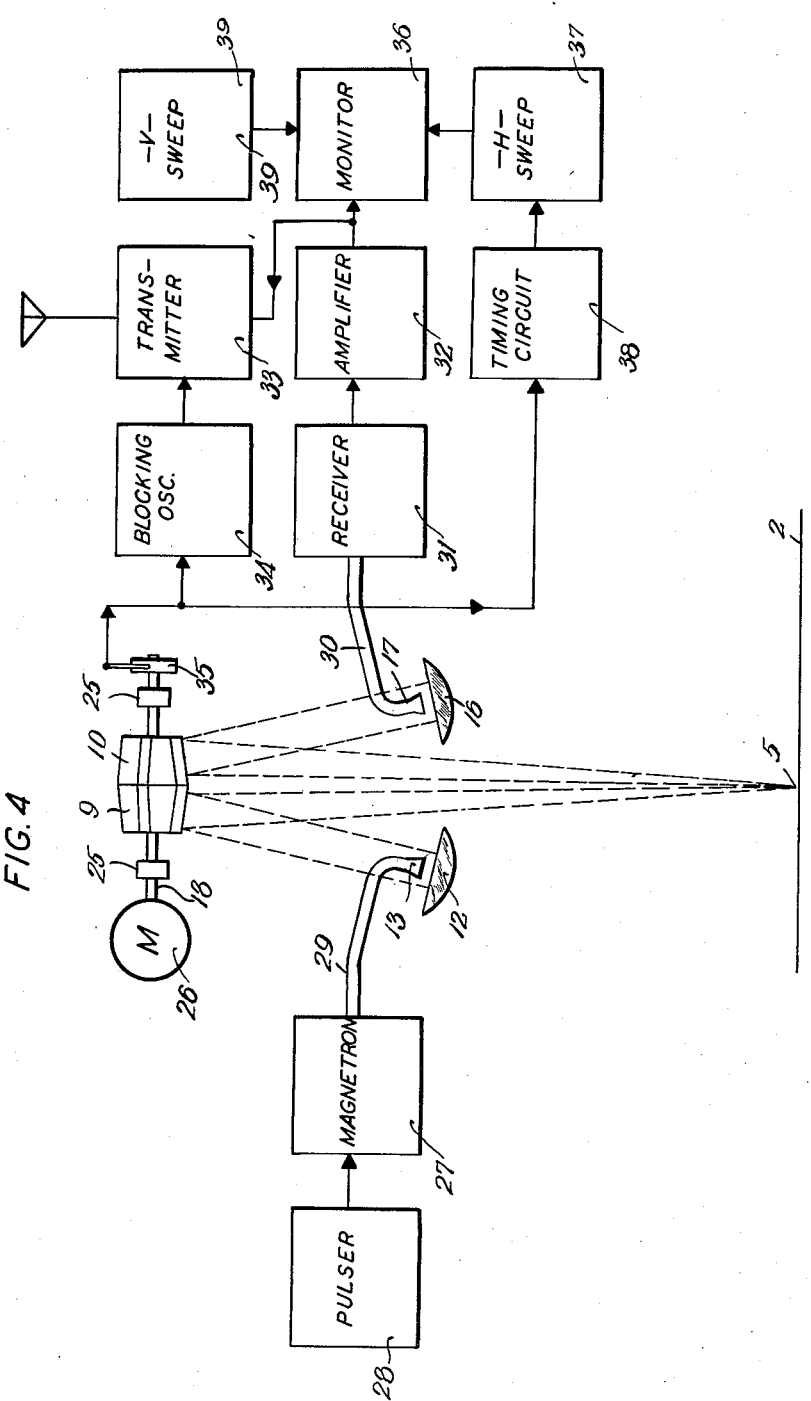
FIG. 4
INVENTORS
JOHN HAYS HAMMOND, JR.
EMORY LEON CHAFFEE
BY
ATTORNEY 3,001,187
MICROWAVE TELERECONNAISSANCE
John Hays Hammond, Jr., % Hammond Research Corporation, Gloucester, Mass., and Emory Leon Chaffee, Belmont, Mass.; said Chaffee assignor to said Hammond
Filed Oct. 21, 1955, Ser. No. 541,978
1 Claim. (Cl. 343—6)

This invention relates to surveying or reconnaissance systems and more particularly to a system which utilizes a scanning beam of radiation and a synchronized search beam in a plane as the means for obtaining information concerning the underlying terrain.

One object of the invention is to separate the "eye" of an observation or reconnaissance system from the "brain" of the system by a long and flexible distance.

Another object of the invention is to provide an "eye" which observes through clouds and fog or at night, thus making the detection of the reconnaissance plane more difficult or permitting observation to continue in cloudy or foggy weather.

A further object of the invention is to provide a secure record of the location of objects on the ground which is available for examination only a few seconds after the reconnaissance plane passes over the area, and which is secure even if the plane is expended.

The system comprises a "seeing" station in a plane and an observing and recording station on the ground, or elsewhere.

In the "seeing" station a focussed or narrow pencil beam of radiation, which may be radio waves preferable of a very short wave length, is made to scan the ground below the plane in a direction perpendicular to the direction of flight. The reflected radiation from the focal point on the ground is automatically directed to the conjugate focus of a spherical mirror and then conducted to a receiver. The variations of the received energy provided by this receiver modulates a high frequency transmitter which transmits the modulation to the distant receiving station.

At the receiving station the received modulation is caused to vary the intensity of the electron beam in a cathode-ray tube, the electron beam being caused to sweep in synchronism with the scanning radio beam in the transmitter. The modulated sweeping fluorescent spot on the screen of the cathode-ray tube is photographed on a continuously moving film. Objects on the ground which reflect a considerable fraction of the incident waves, such as water or ice and metallic objects will appear dark on the film record, while those objects which absorb most of the incident radio waves will appear light on the film record.

The film may be rapidly processed by any well known means, and may then be available for projection on a large screen for examination and study.

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which FIG. 1 is a diagram showing the scanning of the ground from the plane;

FIG. 2 is a side view of the scanning mirrors;

FIG. 3 is an end view of the scanning mirrors;

FIG. 3A is a view of one of the diaphragms for limiting the cross sectional area of the radiation beams;

FIG. 4 is a schematic diagram of the scanning equipment and a block diagram of the circuits in the transmitter; and FIG. 5 is a block diagram of the equipment in the receiving station.

Like reference characters denote like parts in the several figures of the drawing.

In the following description parts will be identified by specific names for convenience, but they are intended to be generic in their application to similar parts.

In FIG. 1, a plane 1 is shown flying with a velocity of V at an altitude of H above the ground 2. A focussed narrow beam of radiation 3, which may be any wave length but is assumed to be in the microwave region of the spectrum, is caused to scan the ground in a direction perpendicular to the direction of flight as illustrated in the figure by the transverse lines 4. The angle of scan $\phi$ may be of any suitable value of the order of 90 degrees. The spot 5 at which the radiation beam strikes the ground is made to be as small as possible. If it has a diameter of $d$ feet, the number of scans per second should be about $V/d$, if V is expressed in feet per second. For example, if V is 440 feet per second and $d$ is 5 feet, there should then be about 88 scans per second.

The scanning is effected by means of rotating reflectors or mirrors. Details of the reflectors are shown in FIGS. 2 and 3. A double ring of equally spaced plane reflectors 9 and 10, made of some metal such as aluminum, are equally spaced around oppositely tapered drums 7 and 8, respectively. In FIGS. 2 and 3, five reflectors are shown in each ring.

The reflectors 9 are inclined with respect to the axis 11 of the drum 7 at an angle which permits the radiation from spherical mirror 12 to be reflected in a plane substantially perpendicular to the axis 11 and yet be unobstructed by mirror 12. The beam of radiation 14, originating from a source 13 close to the principal focus of mirror 12 and reflected by mirror 9, is concentrated at the conjugate focus 5 in FIG. 1 on the ground below the plane.

The reflected radiation 15 from focal point 5 is reflected by the reflector 10 which is contiguous to the reflector 9 for radiation beam 14. Radiation beam 15 is reflected from reflector 10 into spherical mirror 16, and then into a collector 17 located close to the principal focus of spherical mirror 16. The drums 7 and 8 on which reflectors 9 and 10 are mounted are rotated in unison about the axis 11 on a shaft 18.

Diaphragms 19 having square openings, are located in front of each of the spherical mirrors 12 and 16 as indicated in FIG. 3A to limit radiation beams 14 and 15 to a square cross section. Metallic barriers 20 are located so as to obstruct the reflected beams 14 and 15 so that the angle of sweep $\phi$ is of the order of 90 degrees in order that the transmitting beam providing the scan is terminated on one side of the plane at about the same instant that a new scan is started on the other side of the plane. Metallic barrier 21 screens the receiving portion of the system from the transmitting portion.

FIG. 4 shows the mirror assembly of FIGS. 2 and 3 and the associated transmitting and receiving equipment. The rotating reflectors 9 and 10 are rotated at a suitable speed on shaft 18 in bearing 25 by motor 26. The speed is such as to provide scan paths on the ground which are adjacent but do not overlap. The speed of rotation is about queal to $$\frac{V}{5d}$$

revolutions per second, where 5 is the number of reflectors around the drums 7 and 8. If $V/d$ is 88 as assumed, the drums 7 and 8 should rotate at 17.6 revolutions per second, or 1056 revolutions per minute.

The radiation, having a wave length of say 3 centimeters, is generated by a suitable oscillator such as a magnetron in block 27. This magnetron is supplied with pulsed power of a high pulse frequency of 10,000 per second, for example, from the pulser source in block 28. The microwave power from the magnetron in block 27 is fed through wave guide 29 to outlet 13 near the focus of spherical mirror 12.

The energy reflected from the ground at 5 is reflected by reflector 10 and by spherical mirror 16 into receptor 17. From receptor 17 the microwave energy is conducted by wave guide 30 to receiver and demodulator 31. The output of receiver 31, consisting of the variations in reflected energy from the ground, is amplified in block 32 and then used to frequency modulate shortwave transmitter 33, which transmits the modulation to the receiving station on the ground or elsewhere.

In order to synchronize the receiver with the transmitter a marker signal of a high radio frequency, provided by blocking oscillator 34, amplitude modulates transmitter 33 at the beginning of each scan. The blocking oscillator is started at the proper time by a commutator and brush 35 on shaft 18 of the rotating reflectors.

A monitor 36, containing a cathode-ray tube, is actuated by the signals from the amplifier in block 32. These signals vary the intensity of the cathode-ray beam. The beam is caused to sweep in one direction by a sweep generator in block 37, which is initiated by timing circuits in block 38 controlled by the contactor 35. A sweep in the perpendicular direction to that provided by block 37 is supplied by a sweep generator in block 39. The frequency of this sweep is not synchronized with any other part of the system and is made to be slow enough to permit viewing a single frame, yet sufficiently rapid to portray on the monitor screen a view of a strip of ground 500 feet or more in length. A frequency of the order of one per second generally would be satisfactory.

FIGURE 5 shows the essential equipment at the receiving station. Receiver 50 comprises two parts, one for receiving frequency-modulated waves and the other for amplitude-modulated waves. The output of the frequency-modulation part is amplified in block 51 and then modulates the intensity of the cathode-ray beam in cathode-ray tube 52 in accordance with the variation in intensity of the reflected energy from the ground.

The output of the amplitude-modulation part of receiver 50, which consists of the marker pulses of high radio frequency, control timing circuits in block 53. Pulses from block 53 corresponding to the marker pulses, initiate the sweep generator in block 54. The sweep wave from block 54 causes the cathode-ray beam in tube 52 to sweep in synchronism with the scanning of the ground in the transmitter.

The modulated fluorescent spot on the screen of tube 52 is focussed by lens 55 onto film 56 so that the scan lines are perpendicular to the film strip. Film 56 is caused to move through the photographing station 57 at a uniform speed by a motor not shown.

A clock 60, giving time numerically, is periodically illuminated by light flashes and its image, reflected by mirror 61, is recorded on the edge of film strip 56. These time records are used for identifying the positions of the plane corresponding to the record on the film.

Film 56 after passing through station 57 goes through a rapid-processing station 58, and then on to a projecting station 59 where the image on the film is enlarged for study.

Although only a few of the various forms in which this invention may be embodied have been shown herein, it is to be understood that the invention is not limited to any specific construction but may be embodied in various forms without departing from the spirit of the invention.

What is claimed is:

A ground survey system comprising a first transmitter having means producing a radio beam in the microwave range, a first receiver adapted to receive said beam after reflection from a ground area, and a second transmitter having means producing and transmitting a radio carrier wave, all to be carried along a line of flight above the ground area to be surveyed, and a remote second receiver for receiving said carrier wave, said first transmitter having means projecting said beam onto said ground area to be reflected therefrom, means sweeping said beam in a direction transverse to said line of flight for scanning said ground area, means directing said reflected energy to the input of said first receiver, means in said first receiver demodulating said reflected energy to produce an electrical effect proportional to the intensity of said reflected energy and means modulating said carrier wave by said electrical effect derived from said reflected energy, said second receiver having means to demodulate said carrier to obtain a signal representing changes in the energy level of said reflected energy, a cathode ray tube at said second receiver having a source of a cathode ray, means modulating said ray by said signal, sweep means to cause said ray to sweep across said tube and means synchronizing said sweep means with the sweep of said radio beam so that the trace of said ray represents the reflection characteristics of the area of the ground scanned by said radio beam.

References Cited in the file of this patent

UNITED STATES PATENTS

| | | |
|---|---|---|
| 2,419,024 | Iams | Apr. 15, 1947 |
| 2,439,846 | Dicke | Apr. 20, 1948 |
| 2,506,766 | Bartelink | May 9, 1950 |
| 2,552,172 | Hawes | May 8, 1951 |
| 2,578,939 | Moran | Dec. 18, 1951 |
| 2,616,077 | Holser | Oct. 28, 1952 |
| 2,637,022 | De France | Apr. 28, 1953 |
| 2,637,846 | Valley | May 5, 1953 |
| 2,665,619 | Tuttle et al. | Jan. 12, 1954 |
| 2,678,393 | Riblet | May 11, 1954 |
| 2,705,319 | Davber | Mar. 29, 1955 |

FOREIGN PATENTS

| | | |
|---|---|---|
| 670,960 | Great Britain | Apr. 30, 1952 |